Patented Nov. 3, 1953

2,658,064

UNITED STATES PATENT OFFICE 2,658,064

FLUORESCENT AGENTS FROM DIAMINO STILBENE

William Eldred Wallace, Belvidere, N. J., and William Wilson Williams, Easton, Pa., assignors to General Aniline & Film Corporation, New York, N. Y., a corporation of Delaware No Drawing. Application August 10, 1950, Serial No. 178,745

2 Claims. (Cl. 260—247.1)

This invention relates to novel fluorescent agents derived from diamino-stilbene sulfonic (or carboxylic) acids which are of particular value as optical bleaching particularly for incorporation in soaps and other detergents.

The novel fluorescent agents of the present invention may be represented by the following general formula:

Formula I

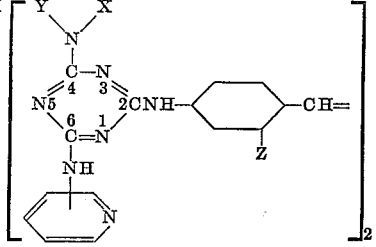

wherein the group

represents —NH₂ or the residue of a primary or secondary amine and Z represents the group COOM or SO₃M in which M represents hydrogen or a cation, usually alkali metal (i. e. sodium or potassium) or ammonium, alkylol amino, etc., or alkaline earth metal such as barium or calcium.

These novel compounds are readily prepared by first condensing a 4,4'-diamino-stilbene sulfonic or carboxylic acid usually 4,4'-diamino-stilbene-2,2'-disulfonic acid (although other 4,4'-diamino-stilbene acids such as 4,4'-diaminostilbene-3,3'-disulfonic acid, 4,4'-diaminostilbene-2,2',6,6'-tetrasulfonic acid, 4,4'-diaminostilbene-2,2'-dicarboxylic acid, or 4,4'-diaminostilbene-3,3'-dicarboxylic acid may be used if desired) with cyanuric chloride; 2 molar proportions of cyanuric chloride (or bromide) being employed for each molar proportion of 4,4'-diamino-stilbene-2,2'-disulfonic acid. The thus obtained primary condensation product is then further condensed with 2 molar proportions of an aminopyridine preferably 2-amino-pyridine (although other amino pyridines such as 3-aminopyridine and 4-amino-pyridine or alkyl substituted aminopyridines such as 2-methyl-6-aminopyridine may be used if desired) whereby there is obtained a novel intermediate product having the following formula:

Formula II

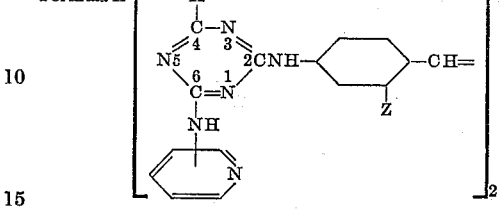

wherein X stands for chlorine or bromine and Z is as defined above.

This novel intermediate product is then finally condensed with 2 molecular proportions of ammonia or a primary or secondary amine in order to obtain the novel products of the present invention.

These condensations may be carried out by procedures commonly employed in the art for effecting such condensations. In order to fully illustrate the preparation of compounds of present invention the following detailed illustrations of the preparation of the novel intermediate of the present invention and of specific fluorescent agents embodied therein are given. The parts are by weight.

*Preparation of intermediate.*—37 parts of cyanuric chloride are dissolved in 120 parts of acetone and poured into a mixture of ice and water. During the suspension in the ice water the temperature of the aqueous suspension should not rise above 5° C. 37 parts of 4,4'-diamino-stilbene-2,2'-disulfonic acid are dissolved in 150 parts of water with the addition of enough sodium carbonate to give a neutral solution. This solution is then added slowly to the cyanuric chloride suspension in ice water and at the same time a solution of sodium carbonate is slowly added in order to keep the mixture from becoming too acid. During this addition and consequent condensation the temperature should not rise above 5° C. The condensation of the cyanuric chloride with the diamino-stilbene-disulfonic acid is complete when a sample of the reaction mixture which has been acidified and treated with sodium nitrite does not develop color when treated with an alkaline solution of "R" salt.

When this condensation is complete a solution of 9.4 parts of 2-amino-pyridine is added to the thus obtained product and immediately afterwards a solution of 160 parts of anhydrous sodium acetate in 400 parts of water is added. The thus obtained mixture is allowed to warm to room temperature and may be heated to 35 to 40° C. if necessary to complete the condensation. Thus there is obtained the novel intermediate of the Formula II above (in which X is chlorine and Z is in 2 position and represents —$SO_3H$) in the form of the free acid.

This product is itself a fluorescent agent but does not have outstanding properties as such and is therefore preferably further condensed with ammonia or a primary or secondary amine to produce the improved fluorescent agents of this invention. This condensation is readily effected by adding approximately 2 mols of ammonia or a primary or secondary amine to the mixture of a novel intermediate product obtained as described above, without purification. There is also added a sufficient amount of alkali such as sodium carbonate in order to increase the pH of the solution to 7.5 to 8 and the mixture is heated to temperature of about 90° C. until the condensation is complete. The novel products of the present invention may then be isolated in the usual manner.

*Preparation of fluorescent agents.*—In each of the following examples the novel intermediate product employed was prepared as described above and was used without purification or other treatment.

EXAMPLE I

The novel intermediate product obtained as above described is mixed with 30 parts of diethanolamine and the pH of the solution is increased to 8.0 to 8.5 by the addition of sodium carbonate solution. The mixture is heated slowly to 90° C. and maintained at that temperature for 3 hours, there is obtained on cooling and isolation in the usual manner the novel product corresponding to the formula:

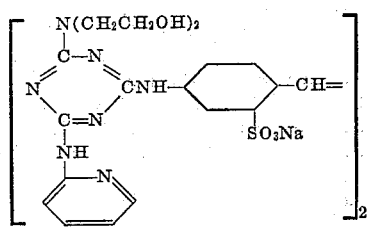

This material is tan in color and moderately soluble in water but very slightly soluble in acetone, alcohol, ether, etc.

EXAMPLE II

To the novel intermediate product obtained as above described there is added 27.9 parts of aniline and the pH is increased to 8.0 to 8.5 by the addition of sodium carbonate solution and the mixture slowly heated to 90° C. and maintained at this temperature for 3 hours. There is obtained on cooling of the reaction mixture and isolation in the usual manner a compound corresponding to the formula:

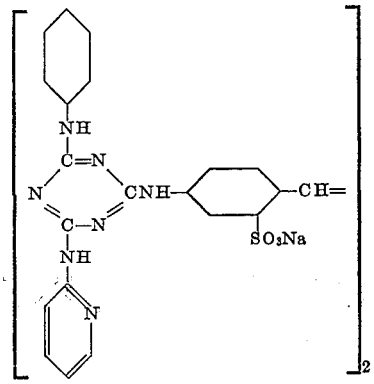

EXAMPLE III

To the novel intermediate product obtained as above described there is added 24 parts of morpholine and the pH is increased to 8.0 to 8.5 by the addition of sodium carbonate solution and the mixture slowly heated to 90° C. and maintained at this temperature for 3 hours. There is obtained on cooling of the reaction mixture and isolation in the usual manner a compound corresponding to the formula:

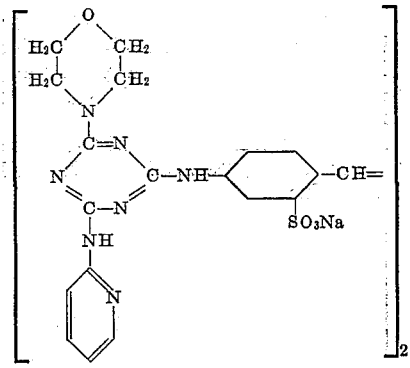

EXAMPLE IV

To the novel intermediate product obtained as above described there is added 32.1 parts of o-toluidine and the pH is increased to 8.0 to 8.5 by the addition of sodium carbonate solution and the mixture slowly heated to 90° C. and maintained at this temperature for 3 hours. There is obtained on cooling of the reaction mixture and isolation in the usual manner a compound corresponding to the formula:

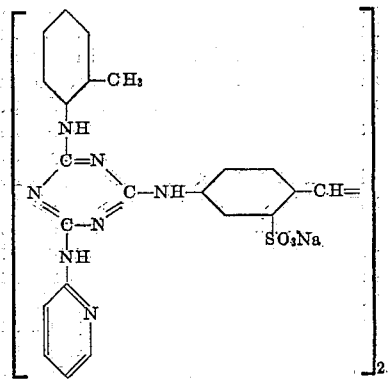

EXAMPLE V

To the novel intermediate product obtained as above described there is added 36.9 parts of p-anisidine and the pH is increased to 8.0 to 8.5 by the addition of sodium carbonate solution and the mixture slowly heated to 90° C. and maintained at this temperature for 3 hours. There is obtained on cooling of the reaction mixture and isolation in the usual manner a compound corresponding to the formula:

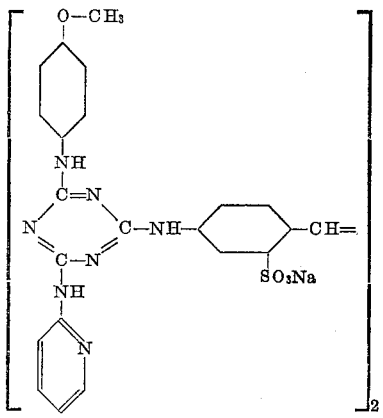

EXAMPLE VI

To the novel intermediate product obtained as above described there is added 36.3 parts of N-ethyl-aniline and the pH is increased to 8.0 to 8.5 by the addition of sodium carbonate solution and the mixture slowly heated to 90° C. and maintained at this temperature for 3 hours. There is obtained on cooling of the reaction mixture and isolation in the usual manner a compound corresponding to the formula:

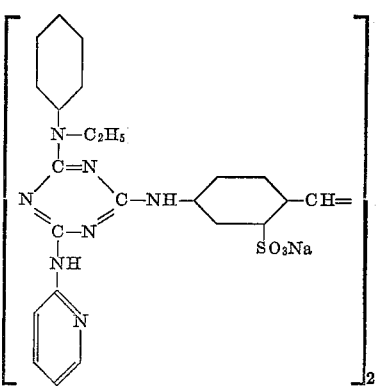

When the above materials are incorporated in discharge pastes and applied to fabrics in the usual manner, the whites thus obtained were noticeably whiter than those using ordinary discharge pastes. When the materials are applied to fibers of cellulose, wool and nylon by methods well known in the art, the white appearance of the fabric was thereby much improved. When small amounts of these materials are added to soaps and synthetic detergents and the resulting mixture employed to wash fabrics, white materials thus washed were extraordinarily whiter in appearance and colored materials brighter than similar materials which are washed using ordinary soaps or detergents.

As examples of amines which may be condensed with the intermediate of Formula II above to produce valuable fluorescent agents of Formula I above in which the group $$\begin{matrix} Y & & X \\ & \diagdown / & \\ & N & \\ & | & \end{matrix}$$

will correspond to the amino radical of the particular amine employed may be mentioned primary alkyl amines such as methyl-, methylol, ethyl-, ethylol, propyl-, isopropyl-, n.-sec.- or tert.-butyl-, dodecyl-, or stearyl-amine etc.; primary aryl amines such as chloro anilines, toluidines, anisidines, xylidines, naphthylamines, anthrylamine, sulfanilic acid, 3-amino phenol etc., also heterocyclic amines such as 2-amino-thiazole, 2-aminobenzothiazole, 2-amino-pyrimidine etc., also cycloalkyl-amines such as cyclohexyl-amine, tetrahydronaphthyl-amine, etc., also alkaryl amines such as benzyl-amine etc. As example of secondary amines which may be used may be mentioned the secondary amines corresponding to any of the above primary amines in which an amino hydrogen has been replaced by an alkyl, aryl, or heterocyclic group, for instance—dialkyl amines such as dimethyl-, diethyl-, methyl ethyl-, dibutyl-, diamyl-, methyl-butyl-, methylcyclohexyl-amines, also N-alkyl aryl amines such as N methyl-, N-ethyl-, or N butyl-anilines, -anisidines, -naphthyl-amines, -amino-thiazoles, -aminopyridines etc., also such heterocyclic secondary amines as carbazole, thiomorpholine, pyrrole, pyrrolidine, indole etc.

A number of derivatives of the type indicated above at 4,4'-bis-[4-amino-6-(2-aminopyridine)-2-5-triazinylamino]-2,2'-stilbenedisulfonic acid and its salts have been prepared and it has been found that the compounds of the present invention which in the 6 position of the triazyl ring contain a 2 amino-pyridine substituent and in 4 position of the triazyl ring contain an amino substituent are desirable fluorescent agents and are superior to known fluorescent agents of the same general type; i. e. which contain no amino pyridine substituent in the triazyl ring but instead contain amino, hydroxy substituents and the like. It is therefore believed that the nature of the amino substituent in 4 position is not highly critical and that substantially any primary or secondary amine, as well as ammonia, may be condensed with the novel intermediate of the present invention to produce valuable fluorescent agents. It is, however, preferable that the amino substituent in 4 position in the triazinyl ring contain no groups such as free amino or hydroxy groups etc. which as a usual rule have an adverse effect on the light and chlorine fastness of the fluorescent agents.

It will be apparent that in the foregoing examples the novel products of the present invention were obtained in the form of their sodium salts. However, the potassium salts have substantially similar properties and it will be apparent that the potassium salts will be obtained by using potassium carbonate and acetate in place of sodium carbonate and acetate as the alkaline agents for the condensations in the synthesis of these materials. The free acids may be obtained by acidification of the sodium or potassium salt while other salts such as the ammonium or alkylol amine salts may be obtained by neutralization of the free acids. Where spirit soluble products are desired, for instance, in brightening of lacquers etc. the higher alkyl or cycloalkyl-amine salts of the free acids such as the cyclohexyl-amine salts of the free acids may be produced by methods known in the art. The alkaline earth metal salts such as the barium and calcium salts which may be obtained from the free acid or by double decomposition of the sodium or potassium salts have been found to be useful for the brightening of photographic prints etc.

In addition to the specific fluorescent agents described above it has been found that the novel products represented by the general Formula I above and which may be obtained by condensing the novel intermediate represented by Formula II above with a wide variety of primary and secondary amines are also valuable fluorescent agents.

The novel fluorescent agents of the present invention fluoresce under ultra-violet light with a bluish fluorescence, and since they are substantive to cellulosic materials, are particularly valuable for incorporation into soaps and synthetic detergents such as alkyl aryl sulfonates, higher fatty acid methyl-taurides, non-ionic detergents such as the polyglycol ethers of alkyl phenols or of partial higher fatty acid esters of mannitol or sorbitol. The fabrics washed with formulations of detergents containing these fluorescent agents appear much whiter in the case of whites and much brighter in the case of colors than fabrics which are washed with ordinary soaps or detergents. These fluorescent agents may also be applied to fabrics by separate treating baths and similar methods and procedures well known in the art. They are also useful when incorporated into paper or other wrapping materials, particularly cellulosic wrapping material to improve the whiteness of such material, as well as to protect the contents from the action of ultra-violet light. They may also be incorporated in discharge pastes whereby the whites obtained upon discharge are decidedly whiter than those discharges made in the absence of such materials. They may also be used to bleach fabrics and in such cases the amount of bleach necessary is materially reduced and one or more steps of the normal bleaching operations may be eliminated.

We claim:

1. Fluorescent brightening agents which in the form of the free acid have the formula:

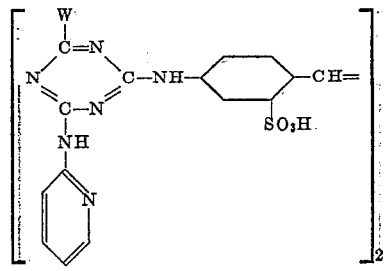

wherein W represents a member of the group consisting of bromine and chlorine, diethanolamino-, anilino-, N-ethylanilino-, toluidino-, anisidino-, and morpholino-.

2. Fluorescent agents which in the form of the free acid have the formula

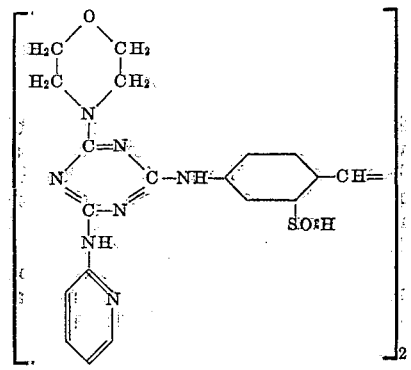

WILLIAM ELDRED WALLACE.
WILLIAM WILSON WILLIAMS.

No references cited.